April 2, 1957  G. E. FRANCK  2,787,054
READILY ADJUSTABLE TUBE CUTTING MEANS
Filed Dec. 3, 1952  2 Sheets—Sheet 1
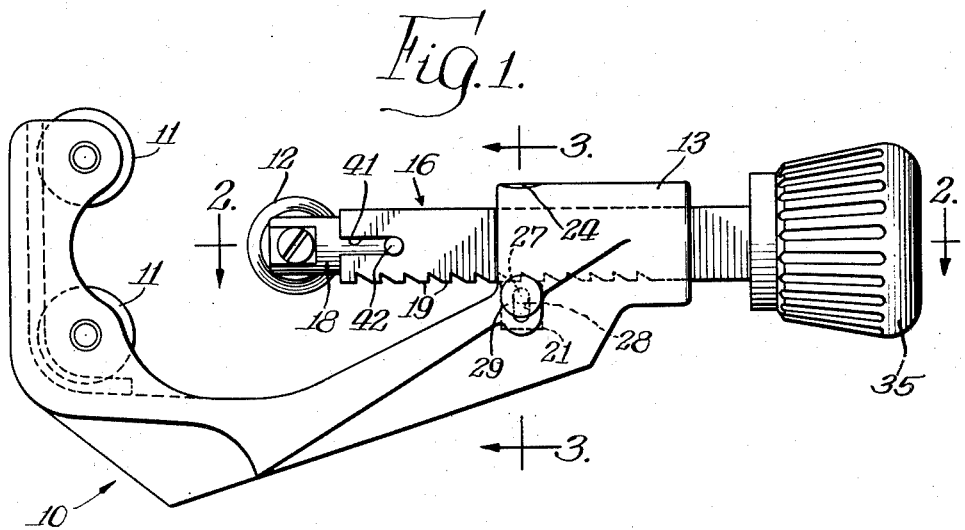
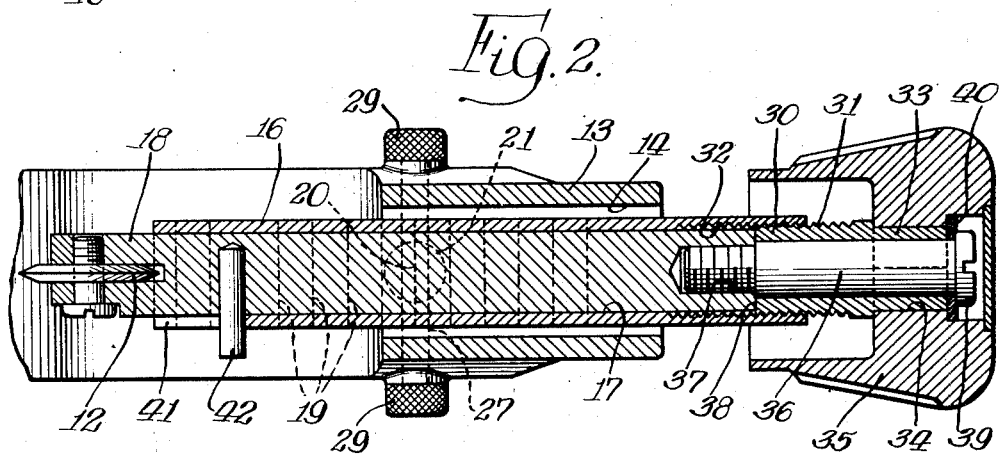
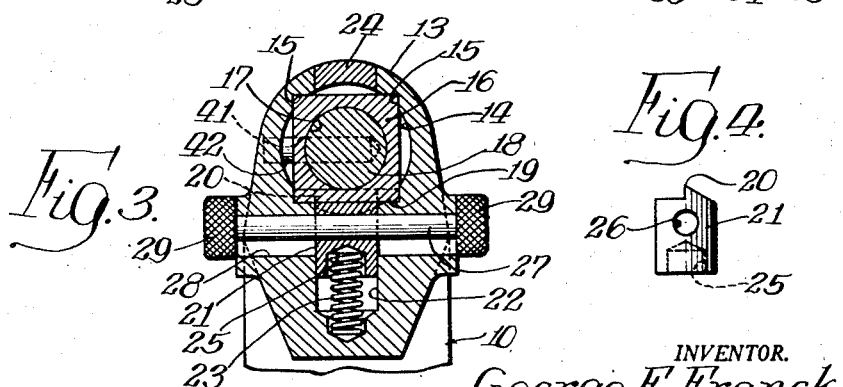
INVENTOR.
George E. Franck,
BY

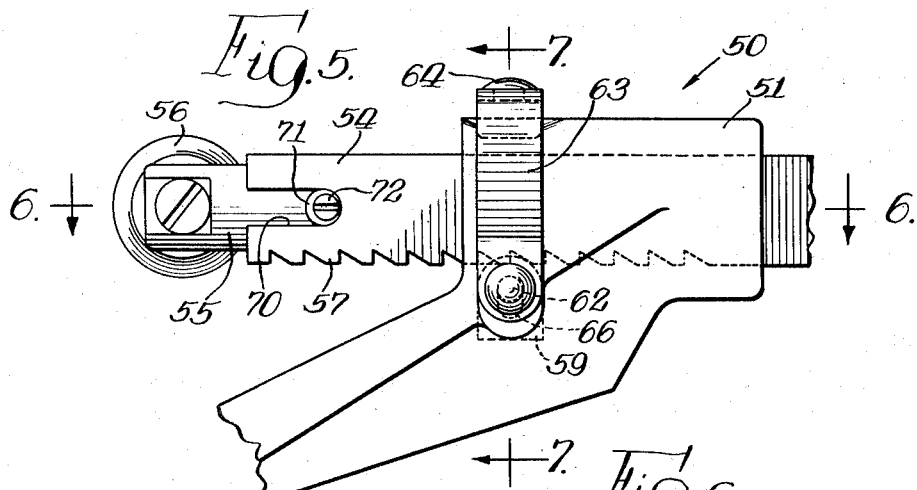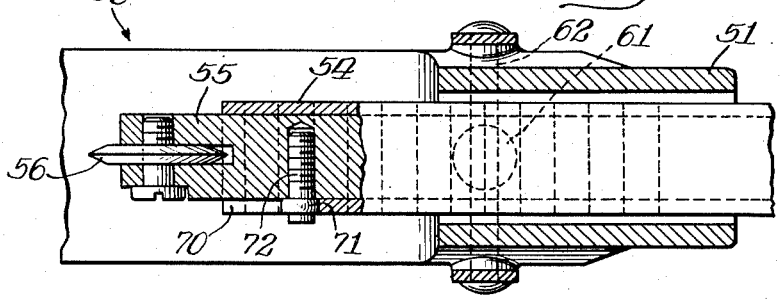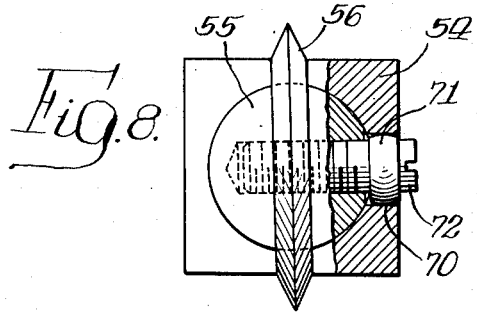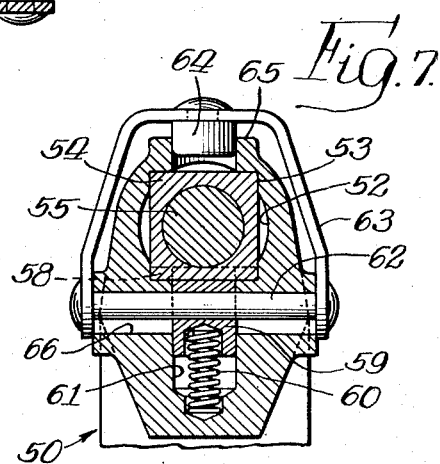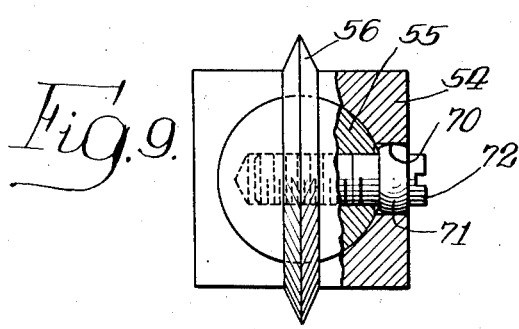

United States Patent Office 2,787,054
Patented Apr. 2, 1957

2,787,054

READILY ADJUSTABLE TUBE CUTTING MEANS

George E. Franck, Riverside, Ill., assignor to The Imperial Brass Manufacturing Company, a corporation of Illinois Application December 3, 1952, Serial No. 323,765

6 Claims. (Cl. 30—102)

This invention relates to a tube cutter and more particularly to a tube cutting tool which is adjustable so as to be usable for cutting tubes of varying diameters.

This application is a continuation-in-part of my copending application, Serial No. 260,995, filed December 11, 1951, now abandoned.

It is the general object of this invention to produce a new and improved tube cutter.

A more specific object of the invention is to produce a tube cutting tool having a frame which is provided with rotatably mounted rollers for contacting one side of a tube to be cut and with a cutter wheel to contact the other side of the tube to be advanced through the side walls thereof with relative rotation between the tube and the frame, with the cutter wheel being carried on one end of an actuating rod slidably received in a support member adjustably mounted on the frame and including means for securing the support member to the frame in any one of a plurality of positions to which it may be adjusted, initially to accommodate between the cutter wheel and the rollers pipes or tubes of various diameters and to further provide means for forcing the rod longitudinally through the support member progressively to advance the cutter wheel through the side walls of the tube to cut the same.

It is a further object of the invention to produce a tube cutter having a cutter wheel and provided with means for properly aligning the wheel so that upon rotation of the tool the cutter wheel will retrace its cutting path. It will be clear to those skilled in the art that should the cutter wheel of a tube cutter become misaligned the cutter wheel, upon relative rotation between the tool and pipe, will cut a thread in the tube rather than cutting through the side walls thereof. In order to accomplish a cut the cutter wheel must retrace its path, cutting deeper each time, in order to cut the tube. It is a further object of the invention therefore to produce a cutting tool wherein the cutter wheel is carried on a member which is rotatably supported and to provide means, which may take the form of an eccentric, for rotating the cutter wheel support relative to the rest of the tool in order that deviations from precise alignment resulting either from manufacturing tolerances or from wear may be corrected.

Other and further objects of the invention will be readily apparent from the following description and drawings, in which:

Figure 1 is a side elevational view of a tube cutting tool embodying the invention;

Figure 2 is a sectional view taken along line 2—2 of Figure 1;

Figure 3 is a sectional view taken along line 3—3 of Figure 1;

Figure 4 is a side elevational view of the pawl device incorporated in the tool;

Figure 5 is a view similar to the right-hand portion of Figure 1 showing a modified form of construction;

Figure 6 is a sectional view taken along line 6—6 of Figure 5;

Figure 7 is a vertical section along line 7—7 of Figure 5;

Figure 8 is an enlarged detailed sectional view showing the cutter wheel, its support, and the means for adjusting its support, and showing the cutter wheel slightly misaligned; and Figure 9 is a view like Figure 8 showing the cutter wheel properly aligned.

While this invention is susceptible of embodiment in many different forms, there are shown in the drawings and will herein be described in detail several specific embodiments, with the understanding that the present disclosure is to be considered as an exemplification of the principles of the invention and is not intended to limit the invention to the embodiment illustrated. The scope of the invention will be pointed out in the appended claims.

Tube cutting tools which include a frame such as the frame 10 having rollers 11 rotatably journaled thereon and carrying a rotatable cutter wheel such as the wheel 12 are well-known in the art. In such tools the rollers 11 contact one side of the tube or pipe while the cutter wheel contacts the opposed side so that the cutter wheel may be advanced through the side walls of the tube during relative rotation between the tube and the tool. For the most part however, previously designed tube cutting tools have been so constructed as to be able to accommodate only a limited number of sizes of tubes in the space between the cutter wheel and the rollers. Means are generally provided in such tools for progressively advancing the cutter wheel as it is rotated around the exterior surface of the pipe or tube so as to produce a cut therein of increasing depth until the entire side wall has been cut through. In such tools the adaptability for use in cutting tubes of different diameters have been limited by the permissible extent of movement of the cutter wheel by the means employed to advance it through the side walls. Because of this, such previous tools could be employed only to cut tubes within a comparatively narrow range of diameters.

According to this invention, however, there is provided a tube cutting tool which incorporates an additional adjusting feature, by reason of which the initial distance between the cutter wheel and the rollers is adjustable over a relatively wide range so that not only may the tool be used to cut tubes which have a large range of diameters, but further, the means for advancing the cutter wheel through the side walls of the tube being cut need be designed to have a range of movement sufficient only to move the cutter wheel radially into the tube a distance equal to the maximum thickness of side walls to be encountered.

To this end the frame 10 is provided with an integral boss or collar portion 13 having a substantially circular opening 14 extending therethrough in the direction of the rollers 11 with the opening having four angular milled portions 15 therein slidably to receive a substantially rectangular support member 16. Extending longitudinally through the support member is a hollow cylindrical opening or bore 17 in which is supported an actuating rod 18 which rotatably carries at its outer end the cutter wheel 12.

The bottom side of the rectangular support member 16 is provided with a plurality of ratchet teeth 19 adapted to be engaged by a tooth 20 formed on the top of a pawl member 21 mounted within the frame. As best shown in Figures 3 and 4, the pawl member 21, which is substantially cylindrical in shape, is slidably received in a drilled hole 22 in the frame. The hole is easily drilled downwardly through the top of the frame and, after insertion of the pawl 21, the top of the hole may be closed by a plug 24. A compression spring 23 seats at one end on the bottom of the hole 22. The other end of the spring bears against a recess 25 formed in the pawl. By reason of this arrangement the pawl 21 is constantly urged against the ratchet teeth 19 to engage the same and to hold the support member within the frame against outward movement relative to the pipe. Extending through a hole 26 in the pawl member is an actuating pin 27 which extends outwardly through a slot 28 formed in the sides of the frame and is provided at its outer end with a pair of knurled knobs 29. The slot 28 is elongated in a direction normal to the longitudinal axis of the support member so that finger pressure on the knobs 29 may move the pin, and hence the pawl, downwardly from the position shown in Figure 3 so as to disengage the tooth 20 thereof from the teeth 19 of the ratchet to permit the support member to be moved in the frame so as to initially position the cutter wheel at any desired distance from the rollers.

Thus the pawl may be depressed to free it from the ratchet teeth and the support member withdrawn to its maximum distance from the rollers while a pipe is positioned in contact with the rollers. At this time the support member may be moved inwardly until the cutter wheel engages the opposite exterior surface of the pipe or tube. The support member may be pushed inwardly toward the pipe without manually disengaging the pawl as the bevel on the teeth merely depress the pawl as the support member is so moved.

To achieve the cut after the cutter wheel has been initially positioned as just described, additional means are provided for slowly and progressively advancing the cutter wheel as it is rotated around the exterior surface of the pipe. To this end there is provided a hollow shaft 30 provided with external threads 31 which engage internal threads 32 formed at the end of the support member 16 opposite the location of the cutter wheel. The inner end of the shaft 30 bears against the outer end of the actuating rod 18 so that rotation of the shaft 30 advances it and consequently the actuating rod longitudinally of the support member. The outer end of the shaft 30 is provided with a squared portion 33 which is engaged by a square opening 34 formed in a knurled knob 35. A bolt 36 engages threads formed in a hollow recess 37 in the end of the actuating rod and is provided with a shoulder 38 to abut the end of the rod. The head 39 of the bolt rides upon a thrust washer member 40. The length of the bolt from its head to the shoulder 38 is equal to or slightly in excess of the thickness of the washer and the length of the shaft so that the bolt may be securely tightened without preventing rotation of the shaft to permit relative rotation between the knob 35 and the bolt 36.

To prevent rotation of the actuating rod 18 within the hole 17, one side of the support member 16 is provided at the end adjacent the cutter wheel with a slot 41, the sides of which slidably engage a pin 42 press fitted in the actuating rod. Thus rotation of the knob 35 serves to move the actuating rod longitudinally through the support member thereby to advance the cutter wheel 12 into and through the side walls of the tube. Because of the fact that the cutter wheel is initially brought into contact with or closely adjacent the side walls of the tube by sliding movement of the support member 16, the screw mechanism 31 and 32 need only be designed to provide sufficient movement of the cutter wheel to advance it through the thickest side walls to be encountered in cutting pipes or tubes of the diameters which the tool may accommodate.

A somewhat modified form of construction is shown in Figures 5–9 inclusive wherein the tool frame 50 is provided with a longitudinally extended integral boss or collar portion 51 which is provided with an elongated opening 52, with the opening having four angular milled portions, one of which is designated at 53, to provide an extended bearing surface for slidably supporting a substantially rectangular support member 54. The support member 54 is provided with an elongated circular hollow extending from end to end thereof in which is supported an actuating rod 55 which carries at its outer end a cutter wheel 56.

The bottom side of the rectangular support member 54 is provided with a plurality of rack teeth 57 adapted to be engaged by a tooth 58 formed on the top of a pawl 59. The pawl is urged into engagement with the rack teeth by a spring 60 seated in the bottom of an opening 61 formed in the boss portion 51. Extending through and secured to the pawl 59 is a pin 62 supporting at its outer ends a yoke-like member 63 which carries a boss or fitting 64 at its apex which is reciprocably received within the outer end of the opening 61. The boss 64 is so proportioned as to have a portion within the opening 61 in all positions of the yoke, thus even when the boss is in its outermost position and the pawl is engaged with the rack teeth, the boss still has a portion within the opening and serving as a guide and steadying means for the yoke.

In forming the portions of the tool just described a hole may be drilled through the boss portion 51 from the upper surface 65 (Figure 7) through the bearing opening 52 and to the lower portion of the tool. The spring 61 and pawl 59 may then be dropped into the portion of the hole 61 below the bearing opening 52 and then the rectangular member 54 slid into place within the opening 52 to retain the pawl and spring therein. The pin 62 may be inserted into a suitable opening in the pawl through a vertical elongated slot 66 formed in the tool and the yoke 63 attached thereto. The upper end of the hole 61 is closed by the boss 64. Not only does the construction just described permit ease of manufacture, but also the operator of the tool may depress the pawl 59 by thumb pressure on the boss 64, thus permitting one-hand operation of the cutting tool.

The rectangular support member 54 is provided with a longitudinal slot 70 in which is slidably received an eccentric 71 carried by a screw 72 which extends into and is secured to the actuating rod 55. The rod 55 is slidable within the rectangular support member and is rotatable therein, with the rod being held against such rotation by contact of the eccentric with the sides of the slot 70. Should the cutter wheel be misaligned, as shown in Figure 8, such misalignment can be corrected simply by rotating the screw 72 thus to rotate the eccentric 71 within the slot and cause slight adjustment rotation between the rod and its support member. Such adjustment is usually accomplished at the factory to take care of slight manufacturing errors and permit the use of greater tolerances in the manufacture of the parts.

In other respects the modified form of Figures 5–9 is similar to the form previously described and shown in Figures 1–4.

I claim:

1. A tube cutter comprising a frame member, rollers journalled in the frame member for contacting one side of the tube to be cut, a support member having a bore completely therethrough and mounted in the frame member for longitudinal movement toward and away from the rollers and having means to prevent rotation of the support member relative to the frame member, means for adjustably securing the support member to the frame in any one of a plurality of positions, an actuating rod slidably carried in the support member bore and having a length substantially equal to the length of the support member, a cutter wheel rotatably carried on one end of the rod to contact the other side of the tube, means for limiting rotation of the rod relative to the support member, a hollow shaft having a portion extending into the bore and contacting the other end of the rod, said shaft further having threaded engagement with said support member, means for maintaining the contact of the shaft with the rod while allowing relative rotation therebetween and a knob fixed to the shaft for rotating the same to move the rod longitudinally in the bore alternatively to advance the cutter wheel through the side walls of a tube being cut and to withdraw the cutter wheels when desired.

2. A tube cutter comprising a frame member, rollers journaled in the frame members for contacting one side of a tube to be cut, an elongated hollow support member mounted in an opening in the frame member for longitudinal movement toward and away from the rollers, a plurality of rack teeth formed along a portion of the support member, said frame member having a hole therein extending from one surface thereof into one side of said opening and bottomed in the frame member on the opposite side of said opening, a spring in the bottom of said hole, a pawl in the hole and urged by the spring into engagement with said rack teeth, a pin secured to the pawl for moving the pawl out of engagement with said teeth, a yoke having its legs secured to opposite ends of the pin, a boss at the apex of the yoke and slidably received in the hole whereby finger pressure on the boss moves said pawl out of engagement to free the support member for said longitudinal movement, an actuating rod carried in the hollow of the support member, a cutter wheel rotatably carried by the rod to contact the other side of the tube, and screw means for moving the rod longitudinally in the hollow to advance the cutter wheel through the side walls of a tube being cut.

3. A tube cutter comprising a frame member, rollers journaled in the frame member for contacting one side of a tube to be cut, an elongated hollow support member mounted in an opening in the frame member for longitudinal movement toward and away from the rollers, means for fixedly securing the support member in the opening in any one of a plurality of positions relative to said rollers, an actuating rod slidably and rotatably carried in the hollow of the support member, a cutter wheel carried by the rod to contact the other side of the tube, a longitudinal slot in the support member, an eccentric slidable in the slot, means for securing the eccentric to the rod in any one of a plurality of rotative positions in the slot to align the cutter wheel, and screw means for moving the rod longitudinally in the hollow to advance the cutter wheel through the side walls of a tube being cut.

4. A tube cutter comprising a frame member, rollers journaled in the frame member for contacting one side of a tube to be cut, an elongated hollow support member on the frame member, an actuating rod slidably and rotatably carried in the hollow of the support member, a cutter wheel carried by the rod to contact the other side of the tube, a longitudinal slot in the support member, an eccentric slidable in the slot, means for securing the eccentric to the rod in any one of a plurality of rotative positions in the slot to align the cutter wheel, and screw means for moving the rod longitudinally in the hollow to advance the cutter wheel through the side walls of a tube being cut.

5. A tube cutter comprising a frame, rollers journaled in the frame for contacting one side of a tube, an elongated hollow support member on the frame member, an actuating rod member slidably and rotatably carried in the hollow of the support member, a cutter wheel carried by the rod member to contact the other side of the tube, a longitudinal slot in one of said members, an eccentric slidable in the slot, means for securing the eccentric to the other member in any one of a pluralty of rotative positions in the slot to align the cutter wheel, and screw means for moving the rod longitudinally in the hollow to advance the cutter wheel through the side walls of a tube being cut.

6. A tube cutter comprising a frame member, rollers journaled in the frame member for contacting one side of a tube to be cut, an elongated hollow support member on the frame member, an actuating rod slidably and rotatably carried in the hollow of the support member, a cutter wheel carried by the rod to contact the other side of the tube, a longitudinal slot in the support member, a screw threaded into the rod and carrying an eccentric portion slidable in the slot to prevent relative rotation between the rod and the support member, said screw being rotatable to rotate the eccentric whereby to align the cutter wheel, and screw means for moving the rod longitudinally in the hollow to advance the cutter wheel through the side walls of a tube being cut.

References Cited in the file of this patent
UNITED STATES PATENTS

| 134,477 | Jepson | Dec. 31, 1872 |
| 330,175 | Vandegrift et al. | Nov. 10, 1885 |
| 343,233 | Esten | June 8, 1886 |
| 439,407 | Kemp et al. | Oct. 28, 1890 |
| 575,688 | Brockett | Jan. 26, 1897 |
| 680,866 | Katzki | Aug. 20, 1901 |
| 708,790 | Winn | Sept. 9, 1902 |
| 852,697 | Beard | May 7, 1907 |
| 963,729 | Barnes | July 5, 1910 |
| 1,505,205 | Kilgour | Aug. 19, 1924 |
| 2,071,756 | Manville | Feb. 23, 1937 |
| 2,284,133 | Condon | May 26, 1942 |
| 2,491,543 | Alfonso | Dec. 20, 1949 |
| 2,556,694 | Husted | June 12, 1951 |
| 2,582,406 | Bachli et al. | Jan. 15, 1952 |
| 2,629,926 | Franck | Mar. 3, 1953 |